Nov. 26, 1963  G. B. STILLWAGON, JR  3,111,825
SHIELD FOR UNIVERSAL JOINTS
Filed Jan. 9, 1962

INVENTOR.
GEORGE B. STILLWAGON JR.
BY
HIS ATTORNEYS 3,111,825
SHIELD FOR UNIVERSAL JOINTS
George B. Stillwagon, Jr., 546 Hathaway Road, Dayton, Ohio, assignor of one-half to Kenneth G. Fraser, Dayton, Ohio
Filed Jan. 9, 1962, Ser. No. 165,124
1 Claim. (Cl. 64—32)

The present invention relates to protective shields for universal joints.

In many applications where universal joints are required, the joint is subjected to mechanical damage due to contact with moving objects. A typical application of this type is in the drive for pin setting machines used in bowling alleys. In such application, the universal joint is frequently removed or disconnected for repair purposes and during such handling is easily damaged.

An object of the present invention is to provide a protective shield for universal joints which will minimize damage of the type described.

Another object of the present invention is to provide a new and improved protective cover for universal joints which does not interfere with the normal operation of the universal joint.

Other objects and advantages reside in the construction of parts, the combination thereof, the method of manufacture and the mode of operation, as will become more apparent from the following description.

Figure 1:
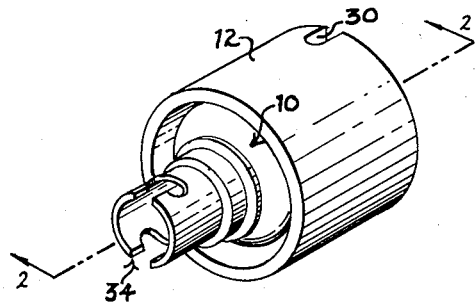
FIGURE 1 is a perspective view illustrating a protective shield of the present invention mounted upon a universal joint.
Figure 2:
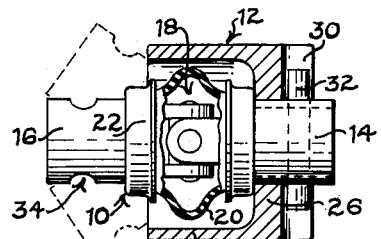
FIGURE 2 is a sectional view, taken along the line 2—2 of FIGURE 1, illustrating possible movements of the universal joint in phantom detail.

Referring to the drawing in greater detail, the protective shield of the present invention is designated by the reference numeral 12 and is illustrated in association with a conventional universal joint 10. As best seen in FIGURE 2, the universal joint comprises a pair of coupling members 14 and 16 joined by a conventional torque transmitting pinning construction 18. Pinning constructions of this type are well known in the prior art and form no part of the present invention.

In the particular universal joint illustrated, the pinning construction 18 is protected from dust by an elastomeric dust cover 20 which encircles the pinning construction and which is tightly secured to the coupling members 14 and 16 by means of ferrules 22 at the opposite ends thereof. This dust cover, while highly durable, is highly susceptible to injury as by puncturing, and it is therefore desirable to provide protection for the dust cover.

The purpose of the universal joint is to enable the driven mechanism to pivot within a limited area relative to the drive shaft. In typical installations, the coupling members 14 and 16 are normally coaxially aligned, as illustrated in FIGURE 2, the joint being able to accommodate a limited misalignment of the driven mechanism with respect to the drive shaft during operation thereof. For the particular universal joint illustrated, the permissible extremes of misalignment are shown in phantom detail.

It is to be understood that a universal joint is designed to accommodate a misalignment in any direction. Thus, the coupling member 16, for example, has complete freedom of pivotal movement relative to the coupling member 14 anywhere within the interior of an imaginary conical surface of revolution the sides of which are coincident with the outermost surface portions of the coupling member 16 at the indicated extremes. This conical surface may be characterized as the locus of extreme pivotal positions of the coupling member 16 relative to the coupling member 14. The axis of such imaginary conical surface is coaxial with the longitudinal axis of the coupling member 14.

While this imaginary surface has been characterized as conical, it is to be emphasized that in most commercially available universal joints the locus of pivotal positions of the coupling member 16 relative to the coupling member 14 only approximates a cone. Nonetheless, in symmetrically designed universal joints of the type illustrated, it is possible to locate a conical surface which is coaxial with the coupling member 14 and which surrounds the coupling member 16 but which is not penetrated by the coupling member 16 at any extreme of its available pivotal movement.

Advantage is taken of this characteristic of universal joints in constructing the shield of the present invention. Thus, it is possible to design a cylindrical shield which will entirely surround the pinning construction for the universal joint and which, by proper selection of its axial length and its internal radius, will lie entirely outside the previously described conical surface. Such a shield is illustrated in the drawing.

The illustrated shield 12 comprises a molded generally cup-shaped body having an annular wall portion 24 integral with a base portion 26. The base portion 26 is apertured so as to fit snugly over the coupling member 14. With the base portion 26 fitted over the coupling member 14 and moved to a position in contact with the ferrule 22 encircling the coupling member 14, the wall portion 24 surrounds the pinning construction for the universal joint. The internal diameter of the wall portion 24 is sufficient that no part of the wall portion projects into the previously described imaginary conical surface.

While the particular proportions of the shield 12 illustrated are selected so as to adapt the shield for the particular universal joint illustrated, it is to be understood that for any given universal joint of the general type described it is possible to construct a shield of the type illustrated. Thus, if the pinning construction requires a shield of greater axial length, it is only required to increase the length of the shield while simultaneously increasing the internal radius thereof. If the universal joint is so designed that the coupling member 16 can deflect through a greater angle than that illustrated, it is only necessary to increase the internal radius of the wall portion 24.

In the present embodiment, the shield 12 is locked in position on the coupling member 14 by means of a pin 32 passing diametrically through the coupling member 14 adjacent the rear surface of the shield. This pin locks the shield axially in covering relation to the pinning assembly 18 so that the shield performs its intended function. In some installations, it is desirable that the shield be secured against rotary movement on the coupling member 14 as well as axial movement. Thus, in the particular universal joint illustrated, the coupling member 16 is adapted for connection to a driven element or a driving element by means of a bayonet socket designated generally at 34. Such bayonet connections are frequently used where it is desired to quickly connect or disconnect the universal joint. Where such connection is used, it is a desirable feature that the shield be secured against rotation relative to the coupling member 14 so that the bayonet connection can be operated merely by rotating the shield. This desirable requirement is satisfied in the present invention by recessing the pin 32 in a diametrically disposed groove 30 formed in the rear surface of the base 26.

In the preferred embodiment of the present invention, the shield is molded from a comparatively durable plastic material such as nylon or polyethylene in sufficient thickness that the shield is substantially rigid. The aperture which is formed in the base 26 is slightly undersized so that the shield has a pressed fit with the coupling member 14. For some applications, this fit is sufficiently tight that the lock pin 32 can be eliminated entirely.

From the foregoing description, it is apparent that the present invention provides a shield for universal joints which fully protects the pinning construction for the universal joint without interfering with the freedom of movement in the universal joint. It is further apparent that such a shield leaves ample room around the pinning construction for a dust cover or the like, as shown.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claim.

Having thus described my invention, I claim:

In combination, a universal joint comprising two normally coaxial elongated coupling members joined by a torque transmitting assembly enabling limited universal pivotal movement of one coupling member relative to the other, a flexible sleeve enclosing said torque transmitting assembly and encircling adjacent portions of said coupling members, ferrules encircling the opposite ends of said sleeve and compressing the ends of said sleeve against said coupling members to seal the ends of said sleeve, one of said coupling members having a transversely disposed bore adapted to receive a pin passing therethrough and projecting radially from said coupling member in predetermined spaced relation to the ferrule thereon, and a shield comprising an annular wall portion adapted to surround said torque transmitting assembly and an integral apertured base having inner and outer faces, the inner face thereof being integral with one end of said wall portion and the outer face of said base having a transverse groove therein communicating with the aperture in said base, the aperture in said base being adapted to receive said one coupling member, the thickness of said base exceeding the separation between the ferrule and the bore in said one coupling member except where said groove traverses the outer face thereof, the thickness of said base at said groove being equal substantially to the separation between said ferrule and said bore, the construction and arrangement being such that said one coupling member may be positioned in the aperture of said base with the ferrule thereon contacting the inner face of said base and said pin may be positioned in said bore with a portion thereof seated in said groove to prevent rotation of said shield on said one coupling member, said ferrule and said pin cooperating to fix the axial position of said shield and thereby locate the annular wall portion of said shield in covering relation to the torque transmitting assembly and the sleeve enclosing the same.

References Cited in the file of this patent
UNITED STATES PATENTS

| | | |
|---|---|---|
| 116,305 | Hall | June 27, 1871 |
| 958,023 | Spicer | May 17, 1910 |
| 1,194,224 | Perkins | Aug. 8, 1916 |
| 1,442,921 | Bockhoff | Jan. 23, 1923 |
| 1,447,492 | Standish | Mar. 6, 1923 |
| 1,670,175 | Wikoff | May 15, 1928 |
| 1,799,661 | Weiss | Apr. 17, 1931 |
| 2,264,728 | Stillwagon et al. | Dec. 2, 1941 |